Patented Nov. 21, 1939

2,180,949

UNITED STATES PATENT OFFICE 2,180,949

FEEDOVER DEVICE

Ludwig W. Blau, Whitman D. Mounce, and William M. Rust, Jr., Houston, Tex., assignors to Standard Oil Development Company, a corporation of Delaware Application July 11, 1936, Serial No. 90,072

7 Claims. (Cl. 181—0.5)

This invention relates to improvements in a method and apparatus for minimizing the effect of direct and refracted seismic waves in seismic prospecting by the reflection method.

The invention will be fully understood from the following description taken in connection with the accompanying drawings, in which latter—

Figure 1:
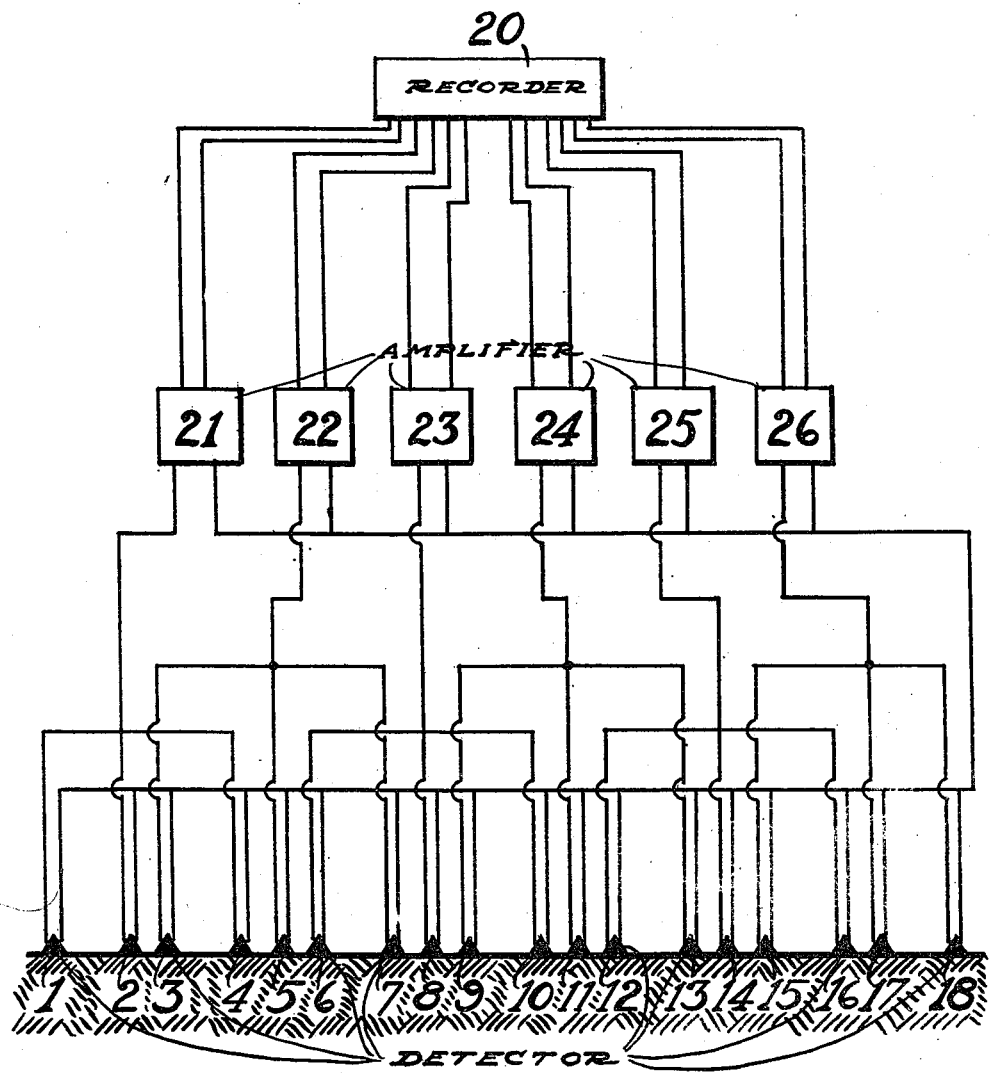
Fig. 1 is a diagrammatic representation of apparatus previously used for decreasing the effect of direct and refracted earth waves.

Referring particularly to Fig. 1, a well known arrangement of apparatus for seismic exploration is illustrated which comprises a plurality of detectors 1 through 18 disposed along the surface of the earth. The number of detectors greatly exceeds the number of seismograph traces to be recorded. In common practice the detectors 1 through 18 are disposed in a substantially straight line aligned with a source of seismic disturbances, not shown. The detectors convert the earth vibrations into pulsations of electrical energy which are caused to actuate a recording device 20 after passing through suitable amplifiers 21 to 26 inclusive. It will be understood that here, as throughout the specification and claims, the word amplifiers is understood to denote the combination of a filter and amplifier as commonly used. In the embodiment illustrated in Fig. 1, a set of detectors 1, 2 and 4 are connected in parallel and to the input of the amplifier 21. Alternatively, the detectors 1, 2 and 4 can be connected in series and to the input of the amplifier 21. The detectors 3, 5 and 7 are similarly connected either in parallel as illustrated or in series and to the input of the amplifier 22. The other detectors are similarly connected to the other amplifiers. The output of each amplifier is connected as illustrated to the recording device 20. The detectors 2 and 3 are placed relatively close together on the surface of the ground or in holes. The detectors 4, 5 and 6 are similarly placed relatively close together in a group and the remaining detectors are similarly arranged in groups as clearly shown in Fig. 1. A number of modifications of this arrangement of detectors has been employed, some arrangements employing more traces than six upon the record. In some arrangements more than three detectors are used in each set. In some arrangements the pickups or detectors instead of being arranged in groups close together are evenly distributed along the surface of the ground.

An object of this invention is to provide a more effective procedure for minimizing the effect of direct and refracted seismic waves. Another object of this invention is to provide for minimizing the effect of direct and refracted earth waves using an arrangement having a reduced number of pickups.

Figure 2:
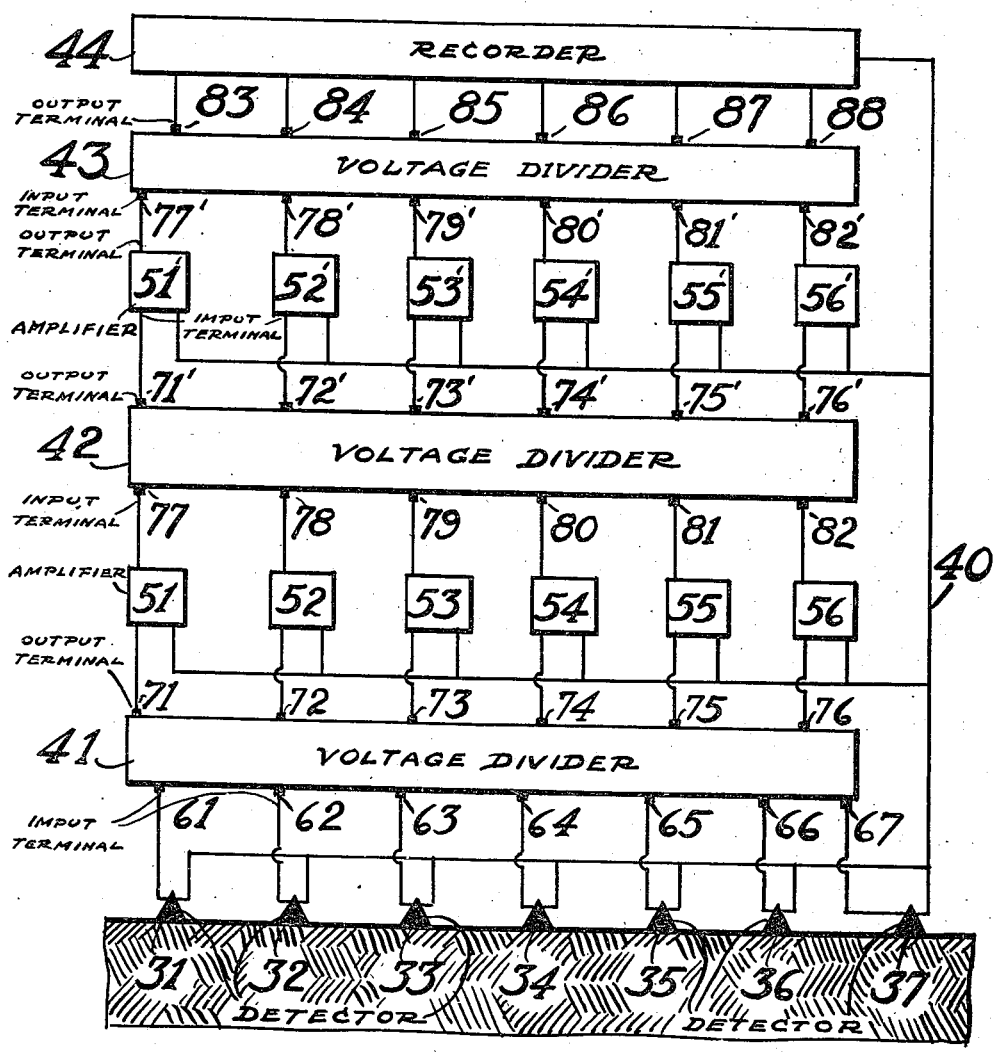
Fig. 2 is a diagrammatic representation of a preferred form of apparatus for carrying out the invention.

Referring to Fig. 2, a preferred embodiment of the invention is illustrated in which numerals 31 through 37 designate detectors with numeral 40 a common conductor, numerals 41, 42 and 43 voltage dividers, numeral 44 a recorder; numerals 51 through 56 and 51' through 56' represent amplifiers. The voltage dividers 41, 42 and 43 are provided with a plurality of input and output terminals. One output terminal of each detector is connected to the common conductor 40. The other output terminal of detector 31 is connected to the input terminal 61 of the voltage divider 41. The other output terminal of detector 32 is connected to the input terminal 62 of the voltage divider 41. Similarly, detectors 33 through 37 are connected to the input terminals 63 through 67 of the voltage divider 41. The output terminal 71 of the voltage divider 41 is connected to the input terminal of amplifier 51. The output terminal 72 of the voltage divider 41 is connected to the input terminal of the amplifier 52. Similarly, the output terminals 73 through 76 are connected to the input terminals of the amplifiers 52 through 56. The ground terminals of the amplifiers 51 through 56 are connected to the common conductor 40. The output terminal of amplifier 51 is connected to the input terminal 77 of the voltage divider 42. The output terminal of the amplifier 52 is connected to the input terminal 78 of the voltage divider 42. Similarly, the output terminals of amplifiers 53 through 56 are connected to the input terminals 79 through 82 of the voltage divider 42. The output terminal 71' of the voltage divider 42 is connected to the input terminal of amplifier 51'. The output terminal 72' of the voltage divider 42 is connected to the input terminal of amplifier 52'. Similarly, the output terminals of 73' through 76' of the voltage divider 42 are connected to the input terminals of amplifiers 52' through 56'. The output terminal of the amplifier 51' is connected to the input terminal 77' of the voltage divider 43. The output terminal of 52' is connected to the input terminal 78' of the voltage divider 43. Similarly, the output terminals of 53' through 56' are connected to input terminals 79' through 82' of the voltage divider 43. The ground terminals of the amplifiers 51' through 56' are connected to the common conductor 40. The output terminals 83 through 88 of the voltage divider 43 are connected to the corresponding terminals of the recorder 44. The ground terminal of recorder 44 is connected to the common conductor 40. Any one or two of the voltage dividers may be omitted and some of the advantages of the invention will be retained.

The term "voltage divider" used in the above description, denotes a network of impedances with a plurality of input terminals and output terminals, these impedances being so connected that the voltages at the output terminals are combinations of the voltages at the input terminals. By proper choice of the type of impedance and the numerical values of the impedances used, the relations between the output voltages and the input voltages can be varied over a wide range and can be made functions of the frequencies, phase relations, and amplitudes of the input voltages.

Figure 3:
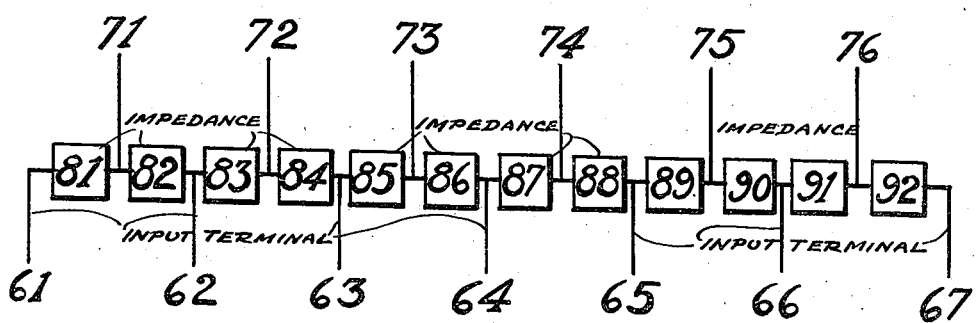
Fig. 3 is a diagrammatic representation of preferred embodiment of the voltage divider.

Fig. 3 is a diagrammatic representation of such a voltage divider. In this figure, the numerals 81 through 92 represent impedances connected in series. The numerals 61 through 67 are the input terminals which are connected at alternate connections between the impedances 81 through 92. The numerals 71 through 76 are the output terminals which are connected to the other connections between the impedances.

Figure 4:
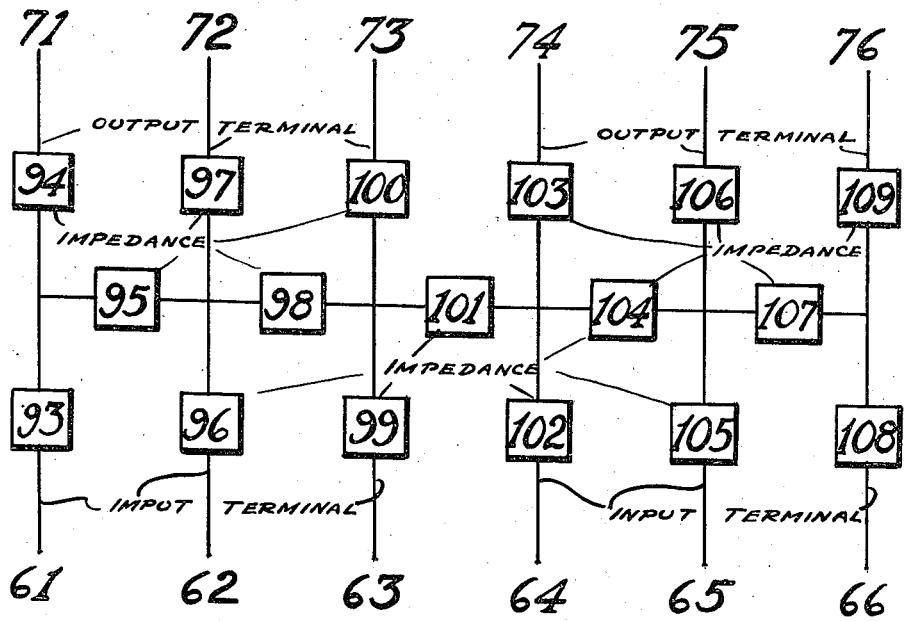
Fig. 4 is a diagrammatic representation of another preferred embodiment of the voltage divider.

Fig. 4 is another embodiment of a voltage divider. In this figure the numerals 61 through 66 represent the input terminals, 71 through 76 represent the output terminals, 93 through 108 represent impedances. In series with each input terminal is an impedance which is in series with an impedance in series with an output terminal, connected between the connections between such pairs of impedances is another impedance. Thus in series with input terminal 61 is impedance 93, in series with which is impedance 94 which is in series with the output terminal 71. In series with the input terminal 62 is the impedance 96 which is in series with the impedance 97 which is in series with the output terminal 72. From the connection between impedances 93 and 94 to the connection between impedances 96 and 97 is the impedance 95.

In seismic prospecting by the reflection method, a seismic disturbance is produced at some point. The energy from this disturbance is transmitted by a variety of paths. At points distant from the source of the seismic disturbance there are located detectors. The seismic vibrations at these detectors are converted into voltages whose frequencies, phase relations and amplitudes depend upon the corresponding quantities of the earth's vibration. The desired portion of this vibration is that caused by the energy which has traveled to a comparatively great depth and been reflected to the earth's surface. In addition to this desired energy there is undesired energy which has traveled along the earth's surface or has been refracted through comparatively shallow strata. The components of the vibration corresponding to energy transmitted along these different paths have been found to be distinguished in two ways, first by their direction of travel and velocities and, second, by their frequencies. The reflected energy having come from a deep bed arrives along a path which is nearly vertical and travels with a high apparent velocity; the other waves having come from shallower beds arrive along paths which are inclined from the vertical and travel with lower velocities. Experience has shown that in any particular region the frequencies of the reflected waves lie within a comparatively narrow band. In the previously known method, as illustrated in Fig. 1, the differences in paths, velocities and frequencies are taken advantage of to reduce the effect of certain undesired waves by so spacing detectors, connected in parallel or series, that the resultant of the voltages produced by the undesired waves at those detectors is small. In this method, however, one is limited to a choice of distances between detectors and number of detectors. The entire output of each detector in a set is combined with the entire output of all other detectors of that set. In order to discriminate against a sufficiently broad band of frequencies and velocities, it is necessary to employ a large number of detectors in each set.

In this invention the number of detectors is the same as the number of traces produced on the record, or is only slightly greater than this number. By means of the voltage dividers, such as shown in Figs. 3 and 4, the output of these detectors may be combined to give voltages at the output terminals of the voltage dividers which are functions of the voltages produced by the detectors. The impedances can be so chosen that the output voltages of the voltage divider are little affected by the undesired seismic vibrations. The entire output of any one detector need not be added to the entire output of any other detector, for by proper choice of the impedances a fraction of this voltage can be added to fractions of the voltages produced by other detectors and the magnitude of this fraction can be chosen at will and can be made a function of the frequency of the voltage. Thus, one is enabled to choose the fractions of the voltages to be added together in such a way that waves which have traveled along various paths and differ in frequency can be largely cancelled out. By proper choice of the impedances in the voltage divider the voltages corresponding to a reflected wave can be transmitted to the records in such a way that each resulting voltage which is recorded depends almost entirely upon the nature of the reflected wave at a single detector, thus giving a number of traces which are distinct as far as the reflected waves are concerned.

Figure 5:
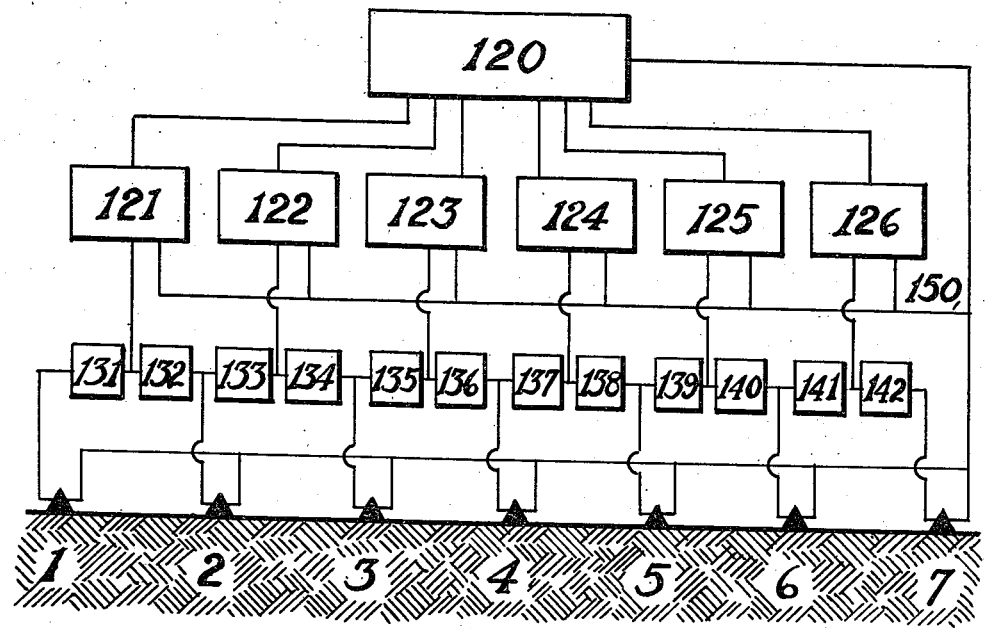
Fig. 5 is a diagrammatic representation of a special form of apparatus for carrying out the invention.

In some instances it is more important to be able to change readily the magnitudes of the fractions of the voltages which are combined to give the output voltage than to have these fractions vary with the frequency of the voltages produced by the detector. In this case the embodiment represented by Fig. 5 is a convenient one.

In this figure, the numerals 1 through 7 represent detectors. The numerals 131 through 142 represent impedances which may be adjustable. The numerals 121 through 126 represent amplifiers. The numeral 120 represents a recorder. The numeral 150 represents a common conductor. The impedances 131 through 142 are connected in series as clearly shown in Fig. 5. One terminal of each detector 1 through 7 is connected to the common conductor 150, the other terminal is connected to a connection between a pair of the impedances 131 through 142. The ground terminal of each amplifier 121 through 126 is connected to the common conductor 150. The input terminal of each amplifier is connected to the connection between a pair of the impedances 131 through 142. The output terminal of each amplifier is connected to the recorder 120. The ground terminal of the recorder 120 is connected to the common conductor 150. The pairs of impedances 131 and 132, 133 and 134, etc., may be the two arms of a potentiometer, the input terminal of the corresponding amplifier being connected to the movable contact of the potentiometer.

Figure 6:
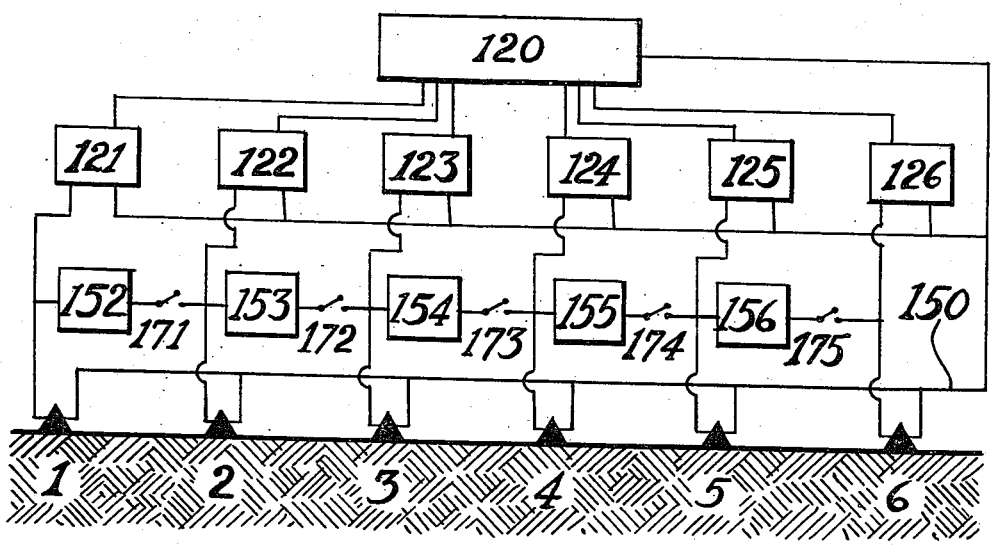
Fig. 6 is a diagrammatic representation of a special form of the apparatus illustrated in Fig. 3.

Fig. 6 shows an embodiment of this invention which is useful in many cases since it embodies switches by means of which one is able to record independently the time of arrival of the initial disturbance at each detector. In this figure, numerals 1 through 6 represent detectors. Numerals 152 through 156 represent impedances which connect the input terminals of the amplifiers 121 through 126. The numerals 171 through 175 are switches which enable one to connect or disconnect these impedances rapidly. The numeral 150 represents a common conductor to which is connected one output terminal of each detector 1 through 6, the ground terminal of each amplifier 121 through 126 and the ground terminal of the recorder 120. The other output terminal of detector 1 is connected to the input of the amplifier 121. The output terminal of detector 2 is connected to the input terminal of the amplifier 122. The output terminals of the other detectors are similarly connected to the input terminals of the other amplifiers. Between the input terminal of amplifier 121 and the input terminal of 122 is connected the impedance 152 in series with the switch 171. Likewise, the other impedances numerals 153 through 156 and the other switches 172 through 175 are connected between the input terminals of the other amplifiers 122 through 126. The output terminal of each amplifier is connected to the recorder 120. In operation, the seismic disturbance is initiated at a point distant from the recorders; when it is initiated the switches 171 through 175 are open. As soon as the first onset of this seismic disturbance has reached all detectors, the switches are closed. Thus one obtains the times of the initial onsets at each detector. In the Gulf Coast where the undesired waves are largely of low frequencies, it is desirable to have the impedances 152 through 156 to be mainly inductive. Thus for the low frequency undesired waves the detectors are connected closely together electrically and if their spacing along the ground is proper the effect of the low frequency waves will be greatly diminished. The reflected energy has a high frequency for which the impedance of the inductances is comparatively large. Thus, the reflected energy received by the detector 1 is transformed into electrical energy which is amplified by the amplifier 121 and recorded by the recorder 120 without being appreciably affected by the electrical energy produced by the other detectors. Thus, six traces are produced which, as far as the reflected energy is concerned, are largely independent and record faithfully the time of arrival of the reflected wave at the individual detectors.

In the embodiments thus far discussed the means for combining fractions of the electric energy produced by the various detectors has been electrical, as distinguished from the electromagnetic means now to be discussed.

Figure 7:
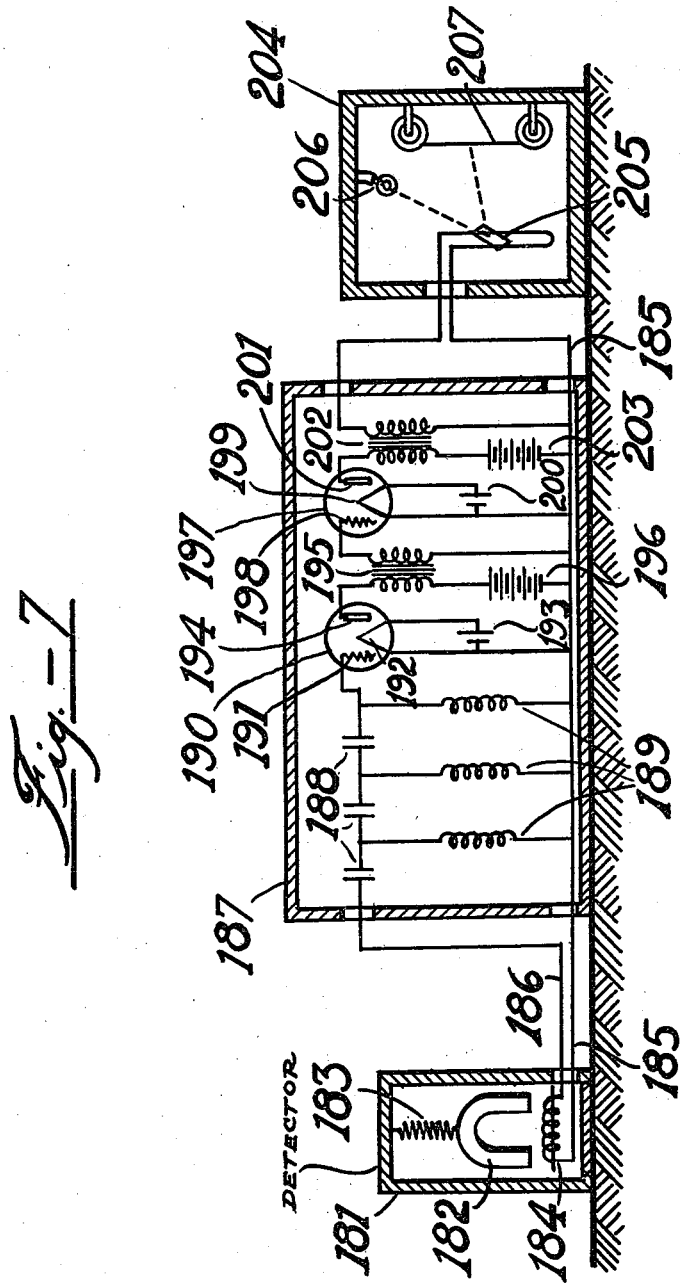
Fig. 7 is a diagrammatic representation of an arrangement of the detector, amplifier and recorder as commonly used in reflection seismograph work.

In order to describe this embodiment of our invention more simply, we show in Fig. 7 a diagrammatic representation of a single detector. filter and amplifier, and recording element.

In Fig. 7 the numeral 181 represents a detector which comprises essentially a magnet 182 supported by a spring 183 near a coil of wire wrapped around a magnetic core 184. One end of this coil is connected to the common conductor 185, the other end of the coil is connected by means of the conductor 186 to the input terminal of the amplifier 187. The amplifier 187 comprises essentially condensers 188, inductances 189, vacuum tubes 190 and 197, transformers 195 and 202. The condensers 188 and inductances 189 are connected to form a high-pass filter as is well known in the art. The output of this filter is connected to the grid 191 of the vacuum tube 190. The filament of the vacuum tube 190 is heated by the battery 193 and is connected to the common conductor 185, as shown by Fig. 7. The plate 194 of the vacuum tube 190 is connected through the primary winding of the transformer 195 and the battery 196 to the common conductor 185. The secondary winding of the transformer 195 is connected to the common conductor 185 and to the grid 198 of the vacuum tube 197. Filament 199 of this vacuum tube is heated by the battery 200 and connected to the common conductor 185. The plate 201 of the vacuum tube 197 is connected through the primary winding of the output transformer 202 and the battery 203, to the common conductor 185. The secondary winding of the transformer 202 is connected to the common conductor 185 and to the responsive element 205 of the recorder 204. The recorder 204 comprises essentially a responsive element 205, a source of light 206 and photographic means for recording 207.

Figure 8:
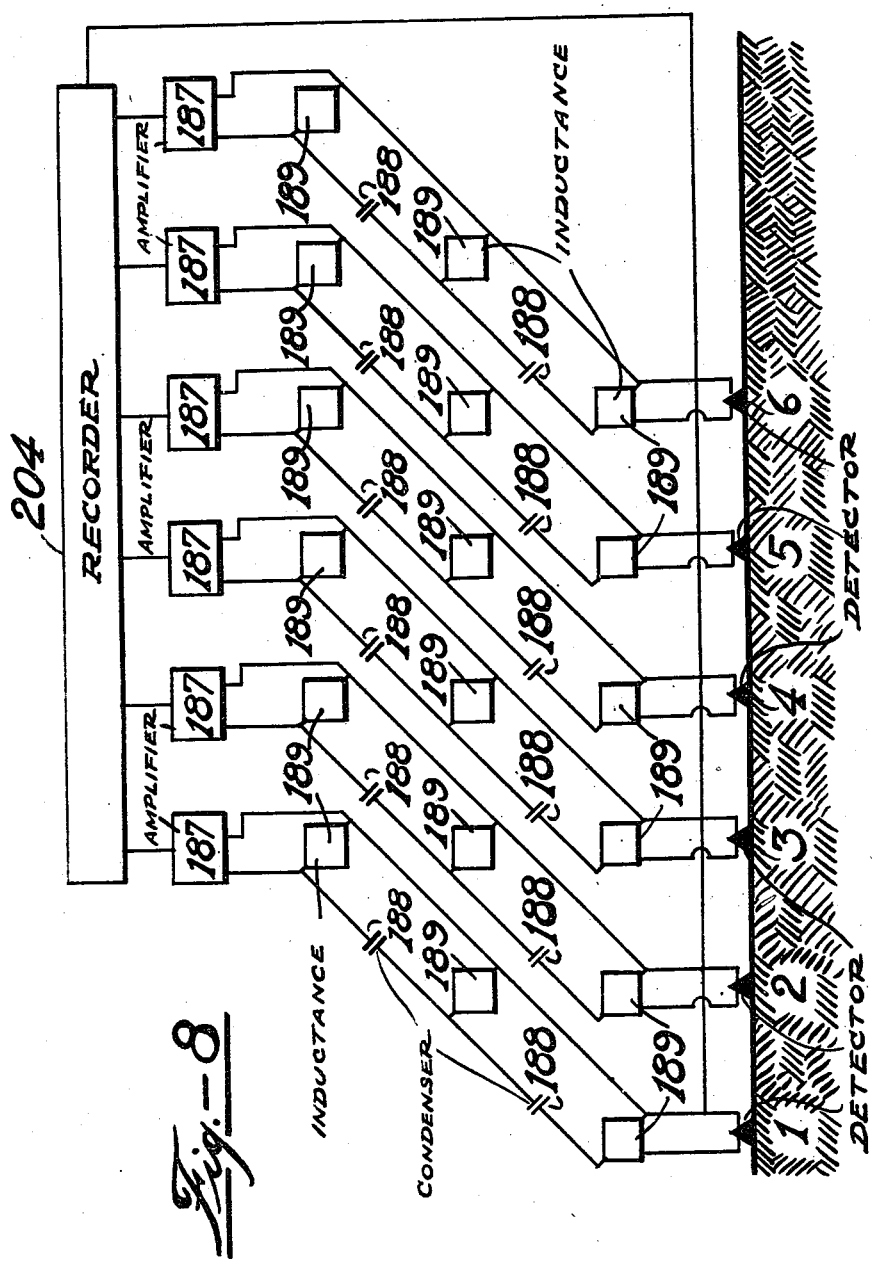
Fig. 8 is a diagrammatic representation showing how the apparatus of Fig. 7 is adapted to carrying out this invention, by placing the inductances employed in the various filters close together.

Fig. 8 is a diagrammatic representation of the manner in which our invention modified the structure of Fig. 7 to accomplish our object. In the customary construction of filters and amplifiers for reflection seismograph exploration, considerable effort is made to so place the inductances of the filters and the transformers employed in the amplifiers that the magnetic field of the inductances and transformers in one filter and amplifier do not interact with the electromagnetic fields of the inductances and transformers in the other filters and amplifiers. In our invention this plactice is reversed. The inductances in one filter are placed sufficiently close to the inductances in the other filters for their electromagnetic fields to interact. Thus in Fig. 8 the numerals 1 through 6 represent detectors. The numeral 188 represents, as in Fig. 7, condensers. The numeral 189 represents, as in Fig. 7, inductances. The numeral 187 represents the remaining portions of the amplifiers. The numeral 204 represents the recorder. In this figure the inductances are placed close to one another in order that their electromagnetic fields may interact. Thus the current which flows in the inductances comprised in the filter connected to the detector number 1 produces an electromagnetic field which in turn causes a current to flow in the inductances comprised in the filters connected to the other detectors. Thus a fraction of the electrical impulse produced by detector 1 is combined with the impulses produced by the other detectors. Similarly by the electromagnetic interaction of the inductance in the filters, fractions of the electrical impulses produced by the other detectors are combined with the impulse produced by detector 1.

Figure 9:
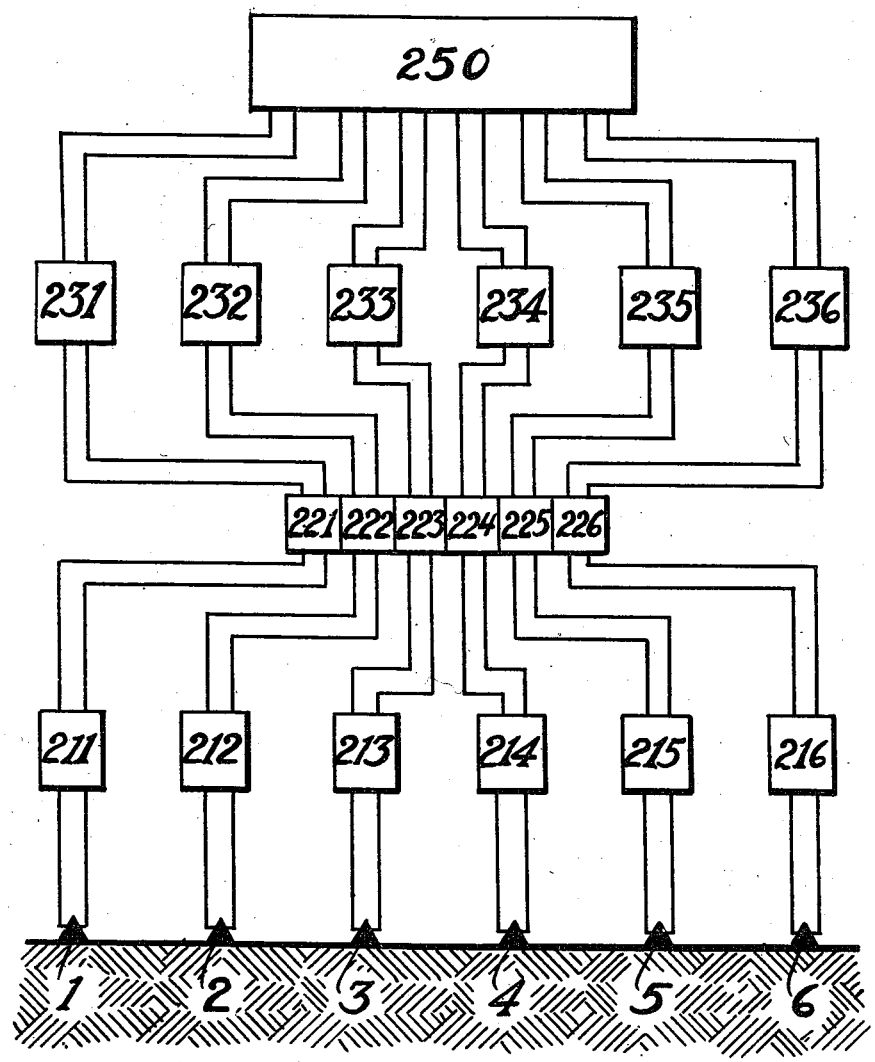
Fig. 9 is a diagrammatic representation showing how the apparatus of Fig. 7 is adapted to carrying out this invention, by placing the transformers used in the various amplifiers close together.

Fig. 9 is another embodiment of the invention. In this figure the numerals 1 through 6 represent detectors. The numerals 211 through 216 represent portions of the amplifiers. The numerals 221 through 226 represent transformers connecting the two portions of the individual transformers. The numerals 231 through 236 represent the other portions of the amplifiers. The numeral 250 represents the recorder. The output of the detector 1 is connected to the input of the portion 211 of the first amplifier. The output of the portion 211 of the first amplifier is connected by means of transformer 221 to the input of the final portion 231 of the first amplifier. The output of the first amplifier is connected to the recorder 250. The other detectors, amplifiers and transformers are similarly connected. In this figure the transformers 221 through 226 are placed sufficiently close together for their electromagnetic fields to interact. The transformers may be the output transformers, in which case the portions 231 through 236 are absent.

The amplifier and filter illustrated in Fig. 7 are not intended as a limitation on the embodiment of our invention as described here. The filtering action may be obtained by other arrangements of inductances and condensers or of inductances, condensers and resistances. There may be more than two vacuum tubes in the amplifier and the interstage coupling may be either impedance or resistance coupling, rather than transformer coupling, and certain modifications of this invention will obviously be applicable.

In each embodiment shown, instead of single detectors 1 through 7, sets of detectors connected either in series or in parallel may be used.

Various changes and alternate arrangements may be made within the scope of the appended claims, in which it is our intention to claim all novelty inherent in the art as broadly as the prior art permits.

We claim:

1. In a method of recording seismic vibrations in which the vibrations are received at a plurality of detectors, converted into pulsations of electrical energy and the pulsations so obtained are recorded, the steps of passing the pulsations generated by the several detectors directly to individual recorders until the first vibrations arriving at the several detectors are recorded, and thereafter passing the electrical pulsations resulting from the arriving vibrations at the several detectors through connected electrical impedances before transmitting them to the recording means.

2. An apparatus for recording seismic vibrations comprising a plurality of detectors for receiving the vibrations including means for converting the vibrations into voltages, said voltages including those of frequencies which are desired to be emphasized on the record and those of frequencies which are desired to be suppressed on the record, voltage recording means, and means for conducting the generated voltages to said recording means including means for causing the voltages of undesired frequencies to combine while leaving the voltages of desired frequencies substantially uncombined.

3. An apparatus for recording seismic vibrations comprising a plurality of detectors for receiving the vibrations including means for converting the vibrations into voltages, said voltages including those of frequencies which are desired to be emphasized on the record and those of frequencies which are desired to be suppressed on the record, a plurality of impedances connected to each other in series, said impedances being of a character to constitute a low impedance path for the voltages of undesired frequencies and a high impedance path for voltages of desired frequencies, means for conducting the generated voltages to connections between the impedances whereby voltages of undesired frequencies are caused to be combined, while voltages of desired frequencies remain substantially uncombined, and voltage recording means electrically connected to connections between said impedances.

4. An apparatus for recording seismic vibrations comprising a plurality of detectors for receiving the vibrations including means for converting the vibrations into voltages, said voltages including those of frequencies which are desired to be emphasized on the record and those of frequencies which are desired to be suppressed on the record, means for amplifying said voltages, a plurality of impedances connected to each other in series, said impedances being of a character to constitute a low impedance path for voltages of undesired frequencies and a high impedance path for voltages of desired frequencies, means for conducting the amplified voltages to connections between the impedances whereby voltages of undesired frequencies are caused to be combined while voltages of desired frequencies remain substantially uncombined, and voltage recording means electrically connected to connections between said impedances.

5. An apparatus, according to claim 3, in which switch means are so arranged that the impedances may be included in or excluded from the circuits connecting the detectors to the recording means.

6. An apparatus, according to claim 3, in which the impedances are inductances.

7. An apparatus, according to claim 3, in which the impedances are resistances.

LUDWIG W. BLAU.
WHITMAN D. MOUNCE.
WILLIAM M. RUST, JR.